March 12, 1963  B. SCHROUGHAM  3,080,850
BIRD RESTRAINING AND RELEASING DEVICE
Filed Feb. 20, 1962  3 Sheets-Sheet 2
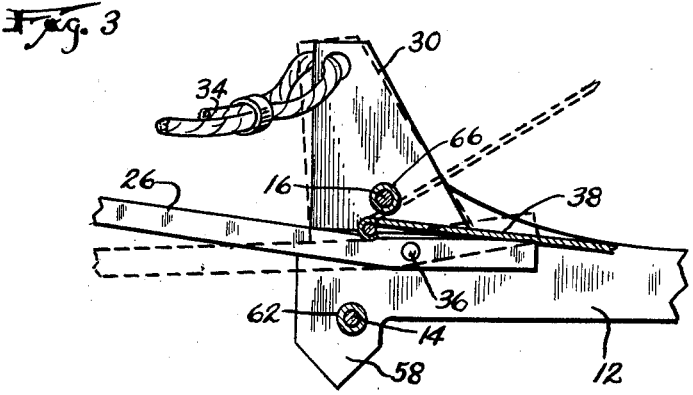
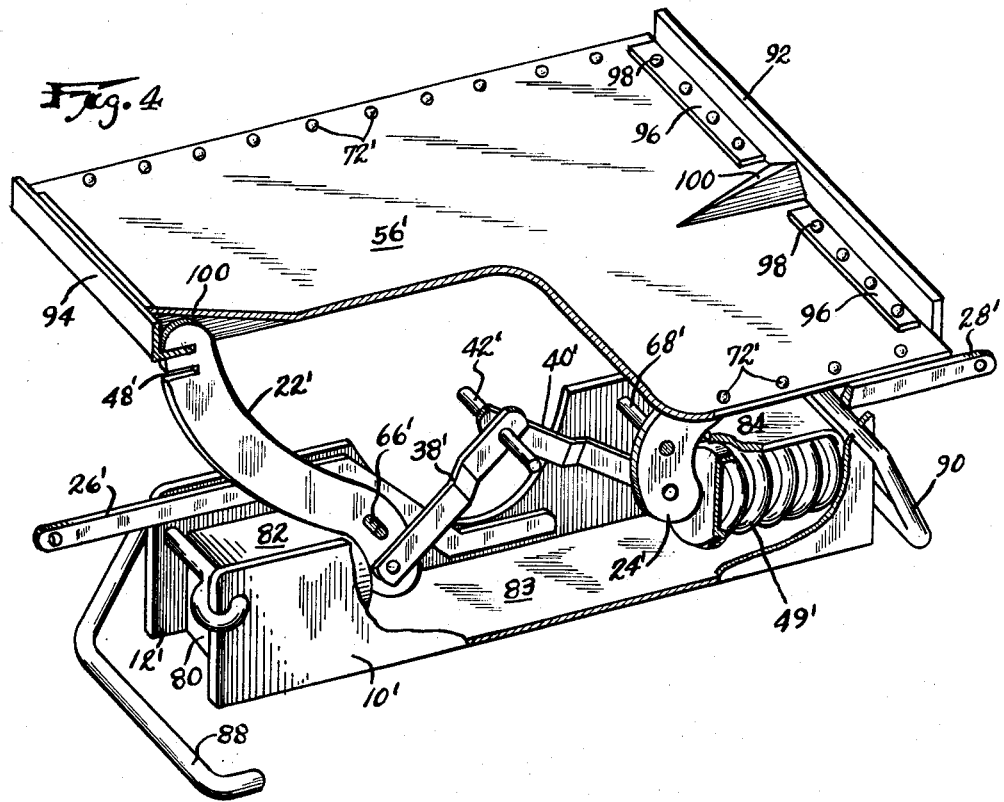
INVENTOR.
BENTON SCHROUGHAM,
BY
ATTORNEY.

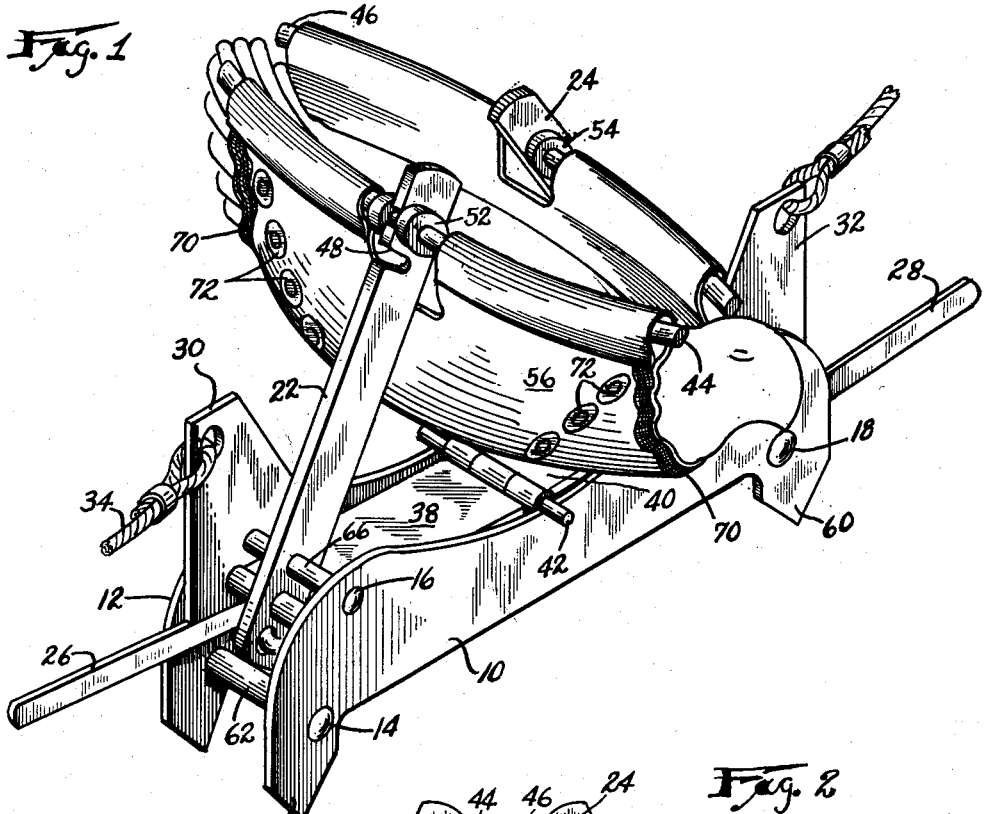
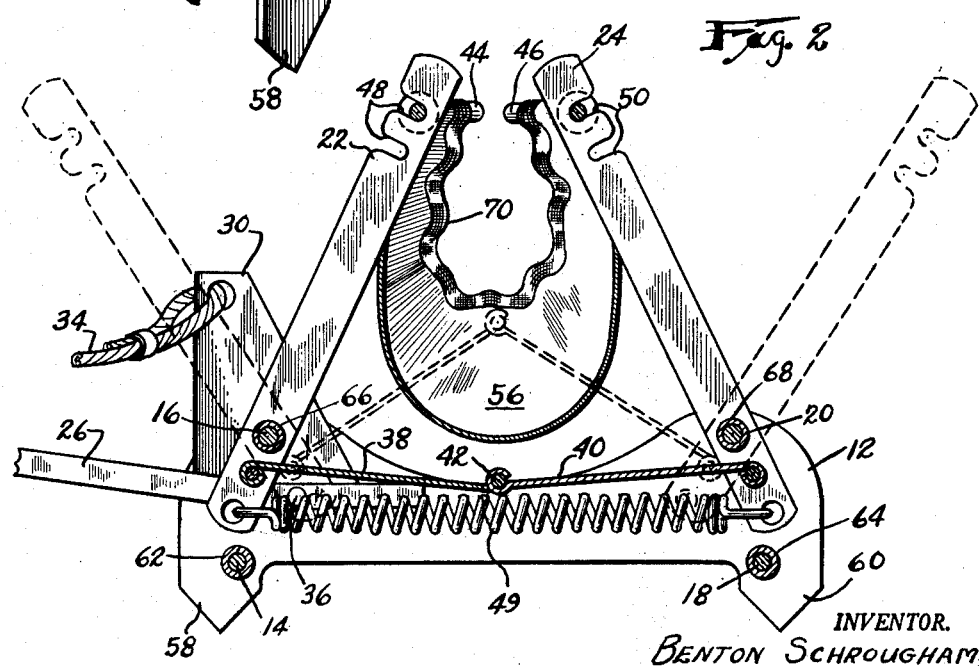

March 12, 1963　　　　　B. SCHROUGHAM　　　　　3,080,850
BIRD RESTRAINING AND RELEASING DEVICE
Filed Feb. 20, 1962　　　　　　　　　　　　　　3 Sheets-Sheet 3
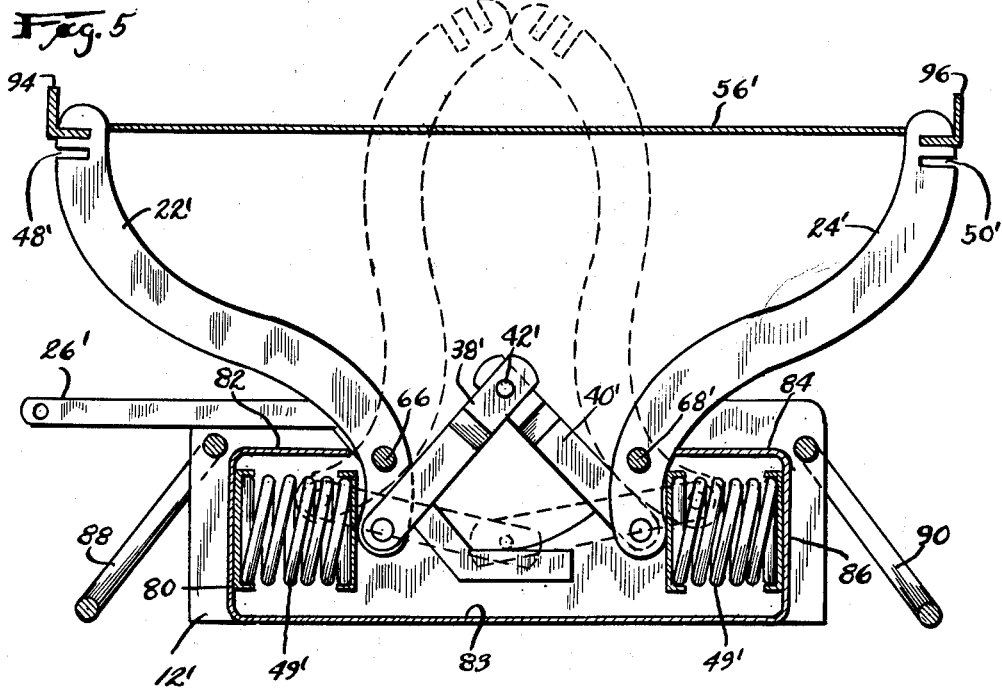
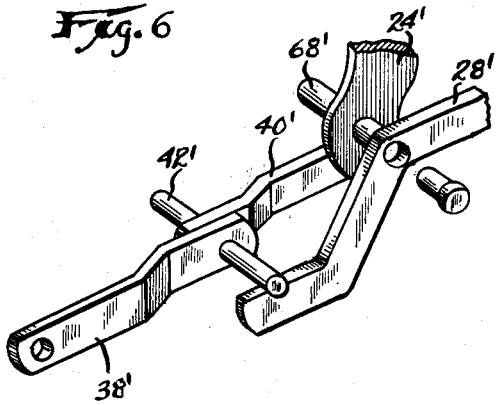
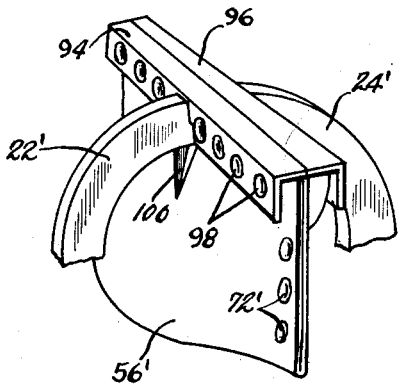
INVENTOR.
BENTON SCHROUGHAM,
BY John W. Lee
ATTORNEY.

United States Patent Office 3,080,850
Patented Mar. 12, 1963

3,080,850
BIRD RESTRAINING AND RELEASING DEVICE
Benton Schrougham 243 S. 25th St., Beech Grove, Ind.
Filed Feb. 20, 1962, Ser. No. 174,461
3 Claims. (Cl. 119—15.6)

This invention relates to a bird restraining and releasing device for the training of bird dogs. More particularly, this invention relates to a device which will restrain a game bird in a comfortable and natural position and will place the bird in flight by catapulting it into the air when a release mechanism is operated.

In the training of bird dogs, it is a common practise to conceal a game bird such as a quail, pheasant, or pigeon, underneath bushy briars, weedy growth, or other suitable cover, and permit a bird dog to locate such concealed birds by scent. Once the bird dog has scented and indicated the location of the bird by pointing, it is desirable to get the bird in flight without permitting the dog to catch the bird. If a dog catches a bird before it gets into flight, it becomes more difficult to teach the dog to remain steady on point to the flight of the bird and a subsequent gunshot. In order to cause the bird to remain concealed in cover, it is sometimes necessary to dizzy the bird by swinging it in a circular motion before placing it in the cover, or to place its head under a wing. In either event, when it is attempted to flush the bird, it may flutter on the ground or become entangled in the briars or other cover, and thus be quite easily caught by the dog.

In accordance with the present invention, I have produced a device which can very easily be concealed in suitable game bird cover, and which will hold or restrain a bird in a normal, comfortable position, without requiring any impairment of the bird's physical or mental facilities. At any desired time a release mechanism can be set off by the trainer to result in placing the bird in a sure and rapid flight by gently tossing it high into the air.

One of the advantages of my device is that the bird is partially exposed to air currents and its body scent is spread about so that it will easily be scented by the dog. Another advantage of my invention is that the bird restraining pocket of my device holds the bird securely and prevents any flapping of wings or other body movements which might permit the dog to locate the bird by sound rather than by scent. Still another advantage of my invention is that the bird restraining pocket may be readily disengaged from the releasing mechanism. Thus the difficulty of holding the bird and trying to cock the device at the same time is avoided. Furthermore, a plurality of pockets may be loaded with birds, and the birds transported in them, thus permitting a new bird to be placed quickly and easily in the device after a previous bird has been put into flight.

One other advantage of my invention is that a very simple and effective trip-releasing mechanism is provided which will permit the trainer to set off the release from either end of the device, or remotely by means of a cord attached to the release mechanism.

Still another advantage of my invention is that one size device may be used with birds of different sizes merely by substituting a bird-holding pocket for a larger or a smaller bird. For example, pockets for quail and pigeons would be smaller than pockets for pheasants or chukar partridges.

Other objects and features of my invention will become apparent from the more detailed description which follows, and from the accompanying drawings. The drawings are merely illustrative, however, and changes may be made so long as the scope of the invention disclosed herein is not violated.

With reference to the drawings:

FIG. 1 is an isometric view of a device embodying the present invention with a bird held therein;

FIG. 2 is a longitudinal section of the device in a cocked position without a bird therein;

FIG. 3 is a fragmentary longitudinal section of the tripping mechanism for the device shown in FIGS. 1 and 2;

FIG. 4 is an isometric view with portions broken away of a modified form of my invention;

FIG. 5 is a longitudinal section of the modified device;

FIG. 6 is a fragmentary isometric view of the fastening mechanism in a locked position; and FIG. 7 is a fragmentary perspective of the bird-holding pocket.

Referring to FIGS. 1 and 2 of the drawings, it will be seen that the invention is shown as embodied in a bird-holding and releasing device comprising a base member, which preferably is metal and comprises an elongated channel formed by spaced vertical walls 10 and 12. The lower outer ends 58 and 60 of the walls may be sharp and extended to facilitate piercing the ground to hold the device in an upright position. The walls 10 and 12 are held together by the pins or bolts 14, 16, 18 and 20, and spaced apart by the spacing members 62, 64, 66, and 68. The vertically positioned bird pocket holding arms 22 and 24 are mounted on the base by means of the pins or bolts 16 and 20. The securing pins 16 and 20 and the spacing members 66 and 68 serve as pivots to permit the arms 22 and 24 to be rotated. The lower ends of arms 22 and 24 are provided with holes through which the ends of the spring 49 are secured to said arms. The lower ends of the arms 22 and 24 are also connected to one another by means of pins or bolts to the toggle joint comprising arms 38 and 40 which are pivoted together at their inner ends in the center by means of the pin 42. The pin 42 is long enough to contact the walls 10 and 12 of the base when the inner ends of the toggle joint arms 38 and 40 drop below the center point at which their outer sides are connected to the lower end of the vertical arms 22 and 24. Thus the lower ends of the vertical arms 22 and 24 are held apart against the action of the spring 49. When the inner ends of the toggle joint arms 38 and 40 are raised above the center point at which their outer ends are attached to the lower ends of the vertical arms 22 and 24, the spring 49 is free to act, and this result is brought about by a release or tripping mechanism. The releasing or tripping mechanism is shown as elongated arm member or lever 26 which is rotatably mounted to a base wall by means of a pin or bolt 36 to provide a fulcrum point. The inner end of the trip arm 26 terminates under the toggle joint arm 38 (see FIG. 3) and the outer end extends a distance outside the end of the base of the device. When the outer end of the trip lever arm 26 is depressed, the inner end will be raised and act upon the toggle joint arm 38 to raise the toggle joint center pin 42 above center and permit the spring 49 to act upon the ends of the vertical bird pocket holding arms 22 and 24. A release or trip lever mechanism may, if desired, be provided on both ends of the device as shown in FIG. 1 trip lever arm 28. Additional tripping or releasing means are useful when it is desired to trip the device at a distance by means of a cord. This is shown as embodied in the plate member 30 which is mounted on the base by means of the connecting pin 16 and the spacing member 66 and directly about the trip lever arm 26. When the rope or cord 34 connected to the plate member 30 is pulled, the plate member rotates about the fulcrum point provided by pin 16 and the lower end tip of the plate depresses the lever arm 26 to operate the release mechanism. As shown in FIG. 1 an additional such means 32 on the opposite end of the device may be used also.

Mounting means are provided on the upper ends of the vertical arms 22 and 24 for a bird-holding and releasing pocket, and they may comprise notches 48 and 50 adapted to secure an elongated member portion of the bird-holding pocket. The bird-holding pocket shown in FIGS. 1 and 2 includes a pair of rigid elongated rods 44 and 46, a sheet of flexible material 56 having its mutually opposite margins attached as illustrated to the elongated rods 44 and 46. Snap fasteners 72 serve to restrict the end openings of the pocket formed when the elongated members are brought together to hold a bird therein. The end openings may alternatively be restricted by elastic members 70. Central portions of the elongated rods of the bird-holding pocket are adapted to fit snugly in the notches 48 and 50 on the vertical arms, and the spacing members 52 and 54 aid in centering the pocket to maintain a horizontal position. If desired, the bird-holding pocket may be permanently secured to the vertical arms rather than being removable.

The embodiment of my invention illustrated in FIGS. 4 and 5 includes a base formed by the spaced walls 10' and 12'. It also includes a bottom member 83, end members 80 and 86 and partial top members 82 and 84. The space provided between these members serves to house the compression springs 49'. The shaped rod members 88 and 90 serve to hold the base walls together and to provide means for stabilizing the device in a vertical position when it rests on the ground. The vertically rotatable bird pocket holding arms 22' and 24' are mounted on the base walls by means of bolts or pivot pins 66' and 68'. The lower ends of arms 22' and 24' are connected to one another by means of a toggle joint mechanism comprising arms 38' and 40' and the center connecting pin 42' as shown in FIGS. 4, 5, and 6. The pin 42' is long enough to contact the walls 10' and 12' of the base when the inner ends of the toggle joint arms 38' and 40' drop below the center point at which their outer ends are connected to the lower end of the vertical bird pocket holding arms 22' and 24'. When the center point of the toggle joint mechanism is in the lower position, the springs 49' are held in a compressed position against the lower ends of the vertical arms 22' and 24'. To permit the springs 49' to act, the toggle joint center pin 42' is raised to the higher position with the trip lever or release mechanism. The trip mechanism includes the lever arm member 26' movably mounted at a fulcrum point on the base wall. One end of said trip lever member terminates underneath the toggle joint pin 42' and the other extends out the end of the base. By depression of the outer end of the lever arm 26', the inner end is raised and moves the toggle joint pin 42' above center to permit the springs 49' to act.

In FIG. 6 a fragmentary section shows a trip or release mechanism on the opposite end of the device. This includes the lever arm 28' mounted on the base by means of pin 63' to provide a fulcrum point and showing the inner end of the lever arm being angled to terminate underneath the toggle joint center pin 42' when in a locked position. Depression of the lever arm 28' at its outer end will raise the inner end and move the toggle joint center pin 42 to an unlocked position. The vertically movable arm members 22' and 24' of this embodiment are curved somewhat to accommodate a bird-holding pocket. The lower ends of these arms are mounted on the base member through pins or bolts 66' and 68' to permit a rotation movement only at the fulcrum point. Their upper ends have notches 48' and 50' to permit mounting of a bird-holding pocket. In this embodiment a bird-holding pocket 56' comprises a sheet of flexible material attached along its mutually opposite margins to a pair of rigid elongate members 92 and 94. The elongate members are shown as angle shaped and the flexible material is attached thereto by means of plates 96 and rivets 98.

A portion 100 of the flexible material in the center is left free to facilitate mounting the elongate members in the notches 48' and 50' on the vertical arms as shown in FIGS. 4 and 7. The snap fasteners 72' provide means for restricting the end openings in the bird-holding pocket when the elognate members are brought together lengthwise.

In using the device illustrated in FIGS. 1 and 2 for bird dog training purposes, the device is put into a cocked position by applying pressure with the foot or otherwise to the center of the toggle joint members to cause the center pin 42 to come to rest on the base walls 10 and 12. This will result in an extension of the spring 49 attached to the lower ends of the vertical bird-holding pocket arms 22 and 24. The upper end of these arms will be moved by this action from the position shown in dotted lines of FIG. 2 to the position shown in solid lines. Additional pressure by the application of one's foot will result in the sharpened ends 58 and 60 of the base penetrating the ground to securely hold the device in an upright position. When the upper ends of the vertical bird-holding pocket arms 22 and 24 are thus brought together, the elongate members 44 and 46 of the bird-holding pocket 56 will be brought together longitudinally. One end of the bird-holding pocket 56 may now be restricted by fastening the snap fasteners 72. A game bird, such as a quail or pigeon, is now inserted into the pocket from the open end, and the snap fasteners 72 at this end are then closed to securely enclose the bird in the bird-holding pocket. Alternatively, when a bird-holding pocket is employed that uses elastic closing means at the ends thereof, as shown by the elastic member 70, the ends of the bird-holding pocket are automatically restricted when the elongate members of the pocket are brought together and it is only necessary to force one end apart in order to insert the bird. After the device is thus placed in a cocked position with the bird held therein and concealed in suitable cover, the bird can be placed in flight at any desired time, as for example, when the dog being trained is stopped on point as a result of scenting the bird. The bird is placed in flight by the application of downward pressure to either of the tripping lever mechanisms 26 or 28 at its outer end, with the foot or by the hand. Such pressure will result in an action at the fulcrum point 36 where the lever is attached to the base resulting in a raising of the toggle joint mechanism by raising the center pin 42 and permit the spring 49 to rapidly act to bring the lower ends of the bird-holding pocket arms 22 and 24 together simultaneously with a rapid parting of the upper ends of said arms in a vertical direction to result in a sudden opening of the bird-holding pocket and thus toss or catapult the bird into the air. Since the bird-holding pocket 56 is detachable from the bird-holding arms 22 and 24, the bird to be utilized in the training device may be placed in a bird-holding pocket and the loaded bird-holding pocket then attached to the device after it has been placed in a cocked position.

The modification of my device shown in FIGS. 4 and 5 is used in a manner similar to the one just described above. In this modification, the toggle joint mechanism including the arms 38', 40' and the center pivot pin 42', cause the lower ends of the vertical bird-holding pocket arms 22' and 24' to be held in a cocked position against compression springs 49'. In this embodiment, the bird-holding pocket is attached along its mutually opposite margins to a pair of elongate members 94 and 92 which are substantially straight lengths of angle stock. This modification is placed in a cocked position by application of downward pressure to the toggle joint center portion, or by application of pressure to the upper ends of the bird pocket-holding arms 22' and 24' so that they are brought together as illustrated by the dotted lines in FIG. 6 and by the solid lines in FIG. 7. The bird-holding pocket in this modification, it is noted, will be substantially closed at the top when the elongate members 94 and 96 are brought together as shown in FIG. 7. Also, when the snap fasteners 72' are snapped together to restrict the ends of the bird-holding pocket 56', a bird contained therein will be completely concealed. A bird thus concealed may be catapulted in the air at any desired time by application of downward pressure to the lever tripping mechanism 26' which will cause the inner end of the lever to raise the toggle joint center upwardly and permit springs 49' to rapidly force the lower ends of the bird-holding pocket arms 22' and 24' together, and thus cause the upper ends of said arms to rapidly fly apart to open the bird-holding pocket the distance permitted by the flexible material and catapult a bird held therein into the air. In this embodiment also, the bird-holding pocket may be in position when the device is cocked, or a bird may be placed in a separate bird-holding pocket, the loaded pocket then mounted on the device after it is placed in a cocked position.

It is to be appreciated that the device may be tripped from a distance by the pulling of a cord or rope 34 attached to a tripping member 30 which through a fulcrum action at the pin 16 will result in the application of pressure to the tripping levers 26 or 28. It should also be appreciated that the base portion of my device may be modified in order to insure its staying in an upright position when placed on the ground in a cocked position with a bird therein. The sharpened ends 58 and 60 of the device shown in FIGS. 1 and 2, and the rod members 88 and 90 shown in FIG. 5, are merely illustrative methods of accomplishing this result.

It is also understood that in the construction of the bird-holding pocket employed with my device that any suitable flexible material may be employed including various types of woven cloth, synthetic sheet materials, and flexible metallic screen. Preferred flexible materials include woven nylon, and strong flexible metallic screen.

What I claim is:

1. A bird restraining and releasing device comprising:
  an elongate base;
  a pair of vertical arms respectively pivotally mounted on said base, said points of mounting being horizontally spaced apart on said base, said arms extending upwardly from said points of mounting a sufficient distance to support a bird restraining pocket, said arms also extending downwardly from said points of mounting on the base a distance within said base to provide fulcrums at said mounting points;
  means for securing said bird restraining pocket to said arms respectively at points near the upper ends thereof;
  spring means positioned in said base and adapted to act suddenly to bring the lower ends of said arms toward each other and to provide action at the fulcrum points to move the upper ends of said arms rapidly away from each other;
  locking means for securing the lower ends of said arms in a spaced apart position opposing the action of said spring means; means for releasing said locking means to permit action of said spring means;
  a bird restraining and tossing pocket comprising a sheet of flexible material, a pair of rigid elongate members to and along the lengths of which respectively mutually opposite margins of said sheet material are attached, the mutually opposite ends of said sheet material having means for restricting the end openings in a pocket formed when said elongate members are held together lengthwise, whereby a bird in said pocket is confined therein, said restricting means adapted to be released when said elongate members are rapidly moved apart horizontally the distance permitted by the flexible sheet material whereby a bird therein is tossed in an upward direction;
  and said pair of rigid elongate members respectively being securely mounted at right angles to and near the opposite upper ends of the said pair of vertical arms respectively pivotally mounted on the base of said device.

2. A bird restraining and releasing device comprising:
  an elongate base;
  a pair of vertical arms respectively pivotally mounted on said base, said points of mounting being horizontally spaced apart on said base, said arms extending upwardly from said points of mounting a sufficient distance to support a bird restraining pocket, said arms also extending downwardly from said points of mounting on the base a distance within said base to provide fulcrums at said mounting points;
  means for securing said bird restraining pocket to said arms respectively at points near the upper ends thereof; spring means positioned in said base adapted to act suddenly to bring the lower ends of said arms toward each other and to provide action at the fulcrum points to move the upper ends of said arms rapidly away from each other; a toggle joint for securing the lower ends of said arms in a spaced apart position opposing the action of said spring means; means for moving the toggle joint off center to permit action of said spring means;
  a bird restraining and tossing pocket comprising a sheet of flexible material, a pair of rigid elongate members to and along the lengths of which respectively mutually opposite margins of said sheet material are attached, the mutually opposite ends of said sheet material having snap fastening means for restricting the end openings in a pocket formed when said elongate members are held together lengthwise, whereby a bird in said pocket is confined therein, said restricting means adapted to be released when said elongate members are rapidly moved apart horizontally the distance permitted by the flexible sheet material whereby a bird therein is tossed in an upward direction;
  and said pair of rigid elongate members respectively being securely mounted at right angles to and near the opposite upper ends of the said pair of vertical arms respectively pivotally mounted on the base of said device.

3. The device as defined in and by claim 2 wherein said bird restraining and tossing pocket is removably mounted on the upper ends of said vertical arms.

References Cited in the file of this patent

UNITED STATES PATENTS

| 2,504,763 | Voecks | Apr. 18, 1950 |
| 2,642,036 | Stuart | June 16, 1953 |
| 2,704,050 | Stachowski | Mar. 15, 1955 |